(No Model.)

W. C. CARPENTER.
REGULATOR FOR NURSING BOTTLES.

No. 244,181. Patented July 12, 1881.

WITNESSES:
A. Schehl
C. Sedgwick

INVENTOR:
W. C. Carpenter
BY Munn & Co
ATTORNEYS.

UNITED STATES PATENT OFFICE.

WILLARD C. CARPENTER, OF NORTH STRATFORD, NEW HAMPSHIRE.

REGULATOR FOR NURSING-BOTTLES.

SPECIFICATION forming part of Letters Patent No. 244,181, dated July 12, 1881.

Application filed March 14, 1881. (No model.)

*To all whom it may concern:*

Be it known that I, WILLARD C. CARPENTER, of North Stratford, in the county of Coos and State of New Hampshire, have invented a new and useful Improvement in Regulators for Nursing-Bottles, of which the following is a specification.

Usually the amount of milk drawn from nursing-bottles is limited only by the hole in the nipple, which is liable to be enlarged by tearing and wear, and, besides, as the child grows its nursing powers increase and the milk is required in regularly-increased quantity.

The object of my invention is to allow regulation of the amount of milk drawn out, according to the age and requirements of the child; and it consists in a regulating plug or faucet combined with the rubber feeding-tube, as hereinafter described and claimed.

Figure 1:
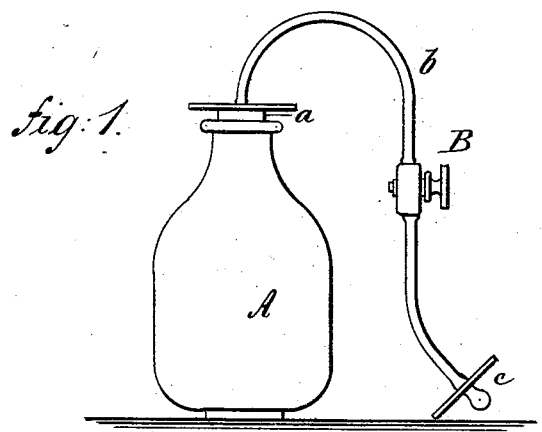
Figure 2:
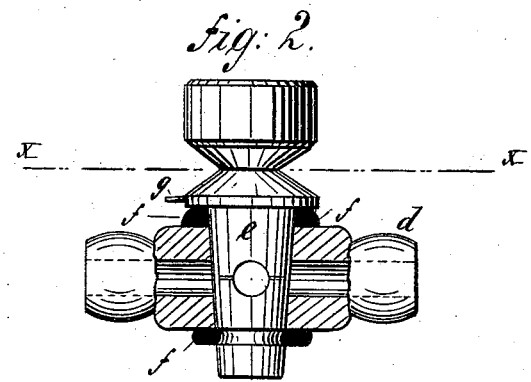
Figure 3:
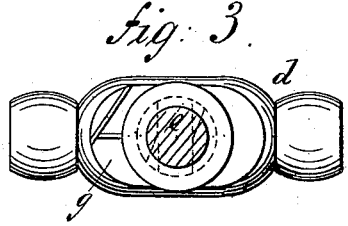

In the accompanying drawings, Figure 1 is a side elevation of a nursing-bottle fitted with the regulator. Fig. 2 is a sectional elevation of the regulating device in larger size, and Fig. 3 is an end view of the same in section on line $x x$ of Fig. 2.

Similar letters of reference indicate corresponding parts.

A is a nursing-bottle, provided with stopper $a$, rubber feeding-tube $b$, and nursing-nipple $c$, all as usual.

B is the regulator, fitted in tube $b$ at about mid-length of the tube.

The regulator consists of a tube, $d$, formed at its ends for entering the ends of the tube $b$, and an apertured plug, $e$, that is seated in tube $d$, so as to turn therein. The plug $e$ is fitted with washers or packing-rings $ff$, of suitable material, which prevent leakage, and the ring $f$ on the lower end retains the plug in the tube $d$. In the head of the plug is fitted a pin, $g$, for indication of the position of the aperture, so that the opening may be regulated as desired.

The regulator is made of hard rubber, celluloid, or other suitable material. It can be readily applied by cutting the rubber tube of the bottle and stretching the cut ends upon the ends of tube $d$.

In use the quantity of milk passing through is regulated by turning plug $e$ more or less. The child receives the milk in regular quantity, as desired, and there will be no danger of its being choked by too great a flow of milk.

The regulator can be readily cleaned without taking apart. A long wire brush is provided with most nursing-bottles, which may be pushed through the tube when the plug is turned to open the aperture to full size.

I am aware that it is not new to use a vent and screw in the stopple of a nursing-bottle, or to use a spigot with a hole in it; but

What I claim is—

The combination, with the flexible tube $b$, of the tube $d$, transversely-apertured plug $e$, having pin $g$, and packing-rings $ff$, all constructed and arranged substantially as shown and described.

WILLARD C. CARPENTER.

Witnesses:
JOHN C. PATTEE,
OLA H. DANFORTH.